United States Patent [19]
Levko

[11] Patent Number: 5,946,151
[45] Date of Patent: Aug. 31, 1999

[54] AUTOMOBILE PIVOTAL MIRROR MOUNTING ASSEMBLY

[75] Inventor: Fred Levko, Wildwood, Mo.

[73] Assignee: Siegel-Robert, Inc., St. Louis, Mo.

[21] Appl. No.: 08/818,365

[22] Filed: Mar. 17, 1997

[51] Int. Cl.[6] .............................. G02B 7/182; A47G 1/24
[52] U.S. Cl. ........................ 359/872; 359/876; 248/481
[58] Field of Search .................... 359/871, 872, 359/876; 248/478, 481, 483

[56] References Cited

U.S. PATENT DOCUMENTS

| | | |
|---|---|---|
| 2,533,475 | 12/1950 | Koonter . |
| 2,600,893 | 6/1952 | Mariani . |
| 2,652,648 | 9/1953 | Morley . |
| 2,701,113 | 2/1955 | Koonter . |
| 2,726,575 | 12/1955 | Koonter . |
| 2,885,235 | 5/1959 | Moskovitz . |
| 2,938,697 | 5/1960 | Slone et al. . |
| 3,250,555 | 5/1966 | Wehner . |
| 3,638,899 | 2/1972 | Damaheiim et al. ................ 248/438 |
| 3,889,915 | 6/1975 | Hashiguchi et al. ................ 248/475.1 |
| 4,357,076 | 11/1982 | Manzoni ................ 248/476 |
| 4,506,954 | 3/1985 | Enomoto ................ 359/874 |
| 4,555,166 | 11/1985 | Enomoto ................ 359/874 |
| 4,558,840 | 12/1985 | Manzoni ................ 248/549 |
| 4,681,409 | 7/1987 | Enomoto ................ 359/877 |
| 4,696,555 | 9/1987 | Enomoto ................ 359/874 |
| 4,764,004 | 8/1988 | Yamada et al. ................ 359/872 |
| 4,776,231 | 10/1988 | Cummins et al. ................ 74/502.1 |
| 4,824,065 | 4/1989 | Manzoni ................ 248/483 |
| 4,867,408 | 9/1989 | Ozaki ................ 248/483 |
| 4,915,485 | 4/1990 | Ogasawara ................ 359/841 |
| 5,031,871 | 7/1991 | Ohta et al. ................ 248/544 |
| 5,274,505 | 12/1993 | Nagayama et al. ................ 359/874 |

FOREIGN PATENT DOCUMENTS

| | | |
|---|---|---|
| 238315 | 4/1962 | Australia . |
| 0064335 | 11/1982 | European Pat. Off. . |
| 1000350 | 8/1965 | United Kingdom . |

*Primary Examiner*—Cassandra C. Spyrou
*Assistant Examiner*—Mark A. Robinson
*Attorney, Agent, or Firm*—Polster, Lieder, Woodruff & Lucchesi, LC

[57] ABSTRACT

An exterior rear view mirror assembly for an automobile is provided. The mirror assembly comprises a mirror mount, a mirror associated with the mirror mount, a support structure which pivotably supports the mirror mount, and a connection assembly which secures the mirror mount to the support structure for pivotal motion relative to the support structure. The mirror mount has a hollow sleeve extending rearwardly therefrom. The support structure has a recess shaped to receive the mirror mount sleeve to allow the sleeve to pivot within the support structure recess and an elongate opening or slot through the recess. The connection assembly includes a pivot member sized and shaped to be positioned within the mirror mount sleeve, a lock key, and a resilient member. The lock key extends through the pivot member opening, the bottom of the sleeve, and the support structure opening to engage the support structure to hold the pivot member and the mirror mount to the support structure. The lock key has a "T" end which passes through spring, and the openings of the pivot member, the sleeve, and the support structure. The support structure opening is an elongate opening or a slot. Upon passing through the support structure opening, the lock key is rotated, for example 90°, so that the T-end of the lock key can engage a bottom surface of the support structure to maintain the assembly together.

36 Claims, 5 Drawing Sheets

AUTOMOBILE PIVOTAL MIRROR MOUNTING ASSEMBLY

CROSS-REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

This invention relates generally to mounting assemblies for the exterior rear (side) view mirrors of automobiles, and, in particular, to a new and improved mounting assembly which will allow the mirror to be freely and easily pivoted about two perpendicular axes.

Automobiles, such as cars, have long been provided with exterior rear or side view mirrors. Such mirrors are almost always pivotally mounted to the side of the car, so that the angle can be adjusted to a desired position by the driver. The side view mirrors were originally adjusted by directly pivoting the mirror. However, most factory-installed side view mirrors are remotely pivoted, either manually by a lever inside the cabin of the car or electronically by operating a pair of motors which in turn pivot the mirror.

Exterior side view mirror assemblies generally include a mirror backing or mirror mount to which the mirror is mounted and a base or support to which the mirror backing is pivotally mounted. This mirror backing/base assembly is then contained in a housing. Connections similar to ball and socket joints have been used in the past to pivotally mount the mirror backing to the base. However, such connections have often employed a screw and sometimes a spring to secure the mirror backing to the base. When a screw is used, the screw can be over-tightened. Such over-tightening can crack or even break the structures which receive the screw. This will result in a loose assembly, and the mirror can wobble in the housing. This will make use of the mirror difficult and can lead to blurry images. Further, if the structures which hold the screw do not break or crack, the over-tightening of the screw can make operation of the mirror assembly difficult. If the mirror is rotated by motors, the over-tightening of the screws can impair the operation of the motor.

Typically, the components of the mirror assembly are all made of plastic. When a spring is used, the spring surrounds a boss into which the screw is threaded, and bears against a washer at the top of the screw. The use of the spring will, over time, stretch the plastic boss which it surrounds. Once the boss stretches, the image stability will decrease and the mirror will provide the user with jumpy or blurry images.

BRIEF SUMMARY OF THE INVENTION

The following objects are set forth in one or more of the claims.

One object of the present invention is to provide a new and improved exterior rear view mirror assembly for an automobile which allows the mirror of the assembly to be pivoted freely about two perpendicular axis.

Another object is to provide such a mirror assembly where the attachment of the mirror to a base is a stable attachment to substantially prevent the mirror from wobbling on its support or base.

A further object is to provide such a mirror assembly in which the pivotal motion of the mirror is smooth.

An additional object is to provide such a mirror assembly in which over-tightening of screws can be avoided.

Yet another object is to provide such a mirror assembly in which plastic parts are not subject to compression or extension forces.

Another object is to provide such a mirror assembly which is simple to manufacture and assemble.

Another object is to provide such a mirror assembly which has a locking sub-assembly which may be pre-assembled and used to connect the mirror backing to the support structure of the assembly.

These and other objects will become apparent to those skilled in the art in light of the following description and accompanying drawings.

The invention, generally stated, provides for an exterior rear view mirror assembly for an automobile. The mirror assembly comprises a mirror mount, a mirror associated with the mirror mount, a support structure which pivotably supports the mirror mount, and a connection assembly which secures the mirror mount to the support structure for pivotal motion relative to the support structure. The mirror mount has a hollow sleeve extending rearwardly therefrom. The sleeve has preferably can have a generally cylindrical section, an arcuate bottom portion, and an opening in the bottom portion. The support structure has a recess shaped to receive the mirror mount sleeve to allow the sleeve to pivot within the support structure recess, and an elongate opening or slot through the recess. Preferably, the support structure recess has at least three ribs projecting inwardly from the wall of the recess. The mirror mount sleeve then sits on the ribs. The support structure also preferably includes a boss extending upwardly from the center of the well. The boss is preferably made from a pair of spaced apart projections.

The connection assembly includes a pivot member or cup sized and shaped to be positioned within the mirror mount sleeve, a lock key, and a resilient member. The resilient member is preferably a helical spring. The pivot member has an opening therethrough. The lock key extends through the pivot member opening, the sleeve opening, and the support structure opening to engage the support structure to hold the pivot member and the mirror mount to the support structure to allow the mirror mount to pivot relative to the support structure and relative to the pivot member. The lock key has a proximal end and a distal end. The resilient member biases the lock key away from the support structure so that the proximal end of the lock key is forced to engage the support structure, to hold the mirror mount for pivotal movement relative to the support structure. The resilient member also applies a force to the pivot member to urge the pivot member against the support structure to allow the mirror mount to pivot relative to the support structure.

Preferably, the pivot member opening has a diameter which is slightly smaller than the outer diameter of the boss in the well of the support structure. The projections which form the boss are sized and shaped to be flexible. Thus, when the pivot member is applied to the boss, the relative sizes of the boss and the pivot member opening cause the projections to deflect inwardly. This tight fit between the pivot member and the boss substantially prevents the mirror mount from wobbling relative to the support structure. This will substantially reduce or prevent instances of the mirror wobbling to improve image stability and decrease jumpy or blurred images when a driver looks into his or her side view mirror.

In the preferred embodiment, the lock key has a "T" shape at its proximal end which passes through spring, and the opening of the pivot member, the sleeve, and the support structure. The support structure opening is an elongate opening or a slot. Upon passing through the support structure opening, the lock key is rotated, for example 90°, so that the proximal T-end of the lock key can be aligned with a slot in a bottom surface of the support structure to be received in the slot. The lock key has, at its top or distal end, a top member which is engaged by the spring. The spring thereby applies a biasing force against the lock key in a direction toward the distal end of the lock key to hold the proximal "T" shaped end of the lock key in the slot of the support structure to hold the assembly together. Preferably, the T-end of the lock key has an edge having a length slightly greater than the diameter of the pivot member opening. The pivot member is made of a resilient plastic. Thus, when the lock key T-end is inserted through the pivot member opening, the pivot member opening deflects or expands slightly to allow the lock key T-end therethrough. The T-end preferably has sloped edges to facilitate passage of the T-end through the pivot member opening. Once the T-end of the lock key passes through the pivot member opening, the pivot member opening returns substantially to its original shape. The T-end thus forms a slight interference fit with the pivot member, which allows for the pivot member, lock key, and resilient member to form a connection sub-assembly. This sub-assembly can be preassembled and then used in its assembled state to connect the mirror mount to the support structure.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

Figure 1:
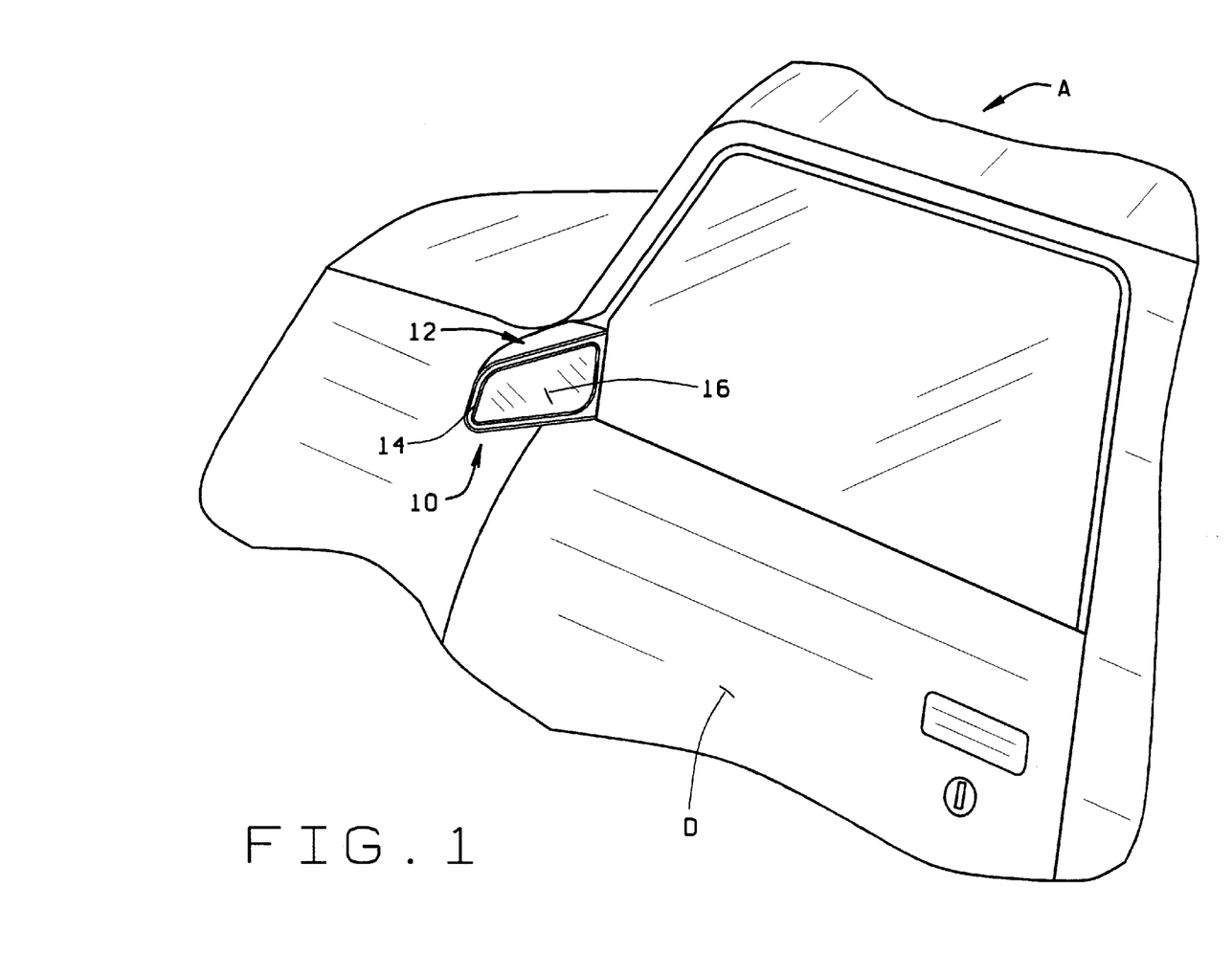
FIG. 1 is a side perspective view of an automobile having a side-view mirror.

An exterior rear view mirror assembly 10 is mounted to the exterior of an automobile A, generally on the door D of the automobile in a position to be seen by the driver, as seen in FIG. 1. The mirror assembly 10 is mounted in a housing 12 which has an opened side 14 so that the mirror 16 of the assembly 10 is visible. As is common, the mirror 16 is mounted in the housing 12 to be pivotal relative to the housing 12 so that a driver may position the mirror to his or her liking. The mirror thus may be pivoted directly by manipulating the mirror in the housing, or preferably, remotely. Remote manipulation of the mirror may be performed manually by moving a lever inside of the car or electronically by operating a switch which drives a pair of motors, which in turn, move the mirror, as is known.

Figure 3:
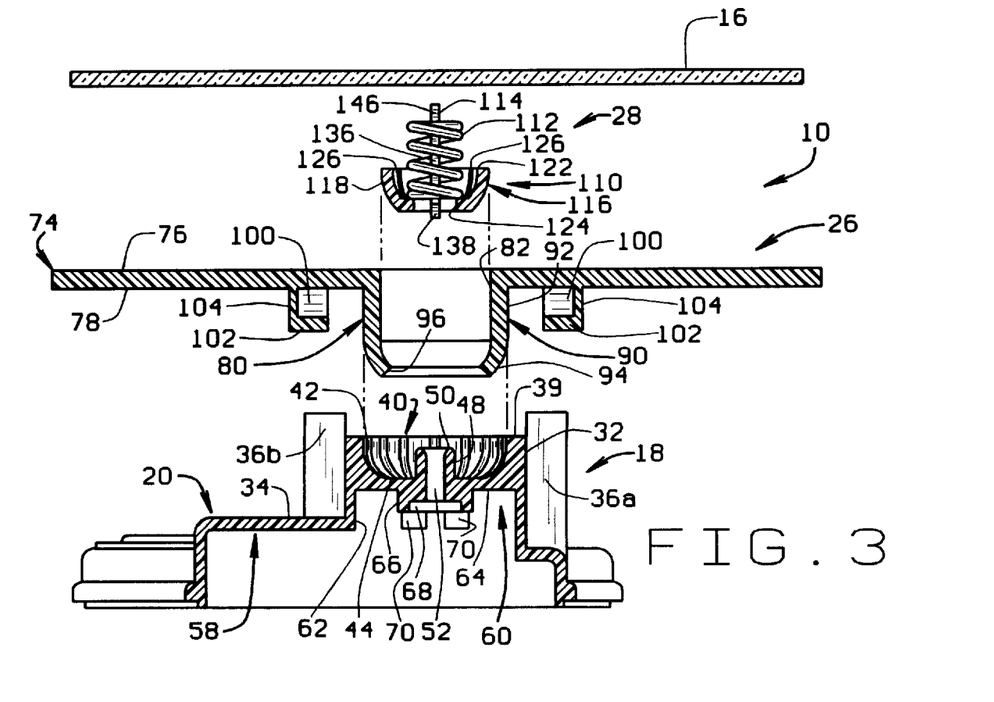
FIG. 3 is an exploded cross-sectional view of a mirror assembly of the present invention showing the subassembly of FIG. 2 positioned for installation with a mirror mount and with a support structure, the support structure being illustrated as a cover for a motor assembly.
Figure 4:
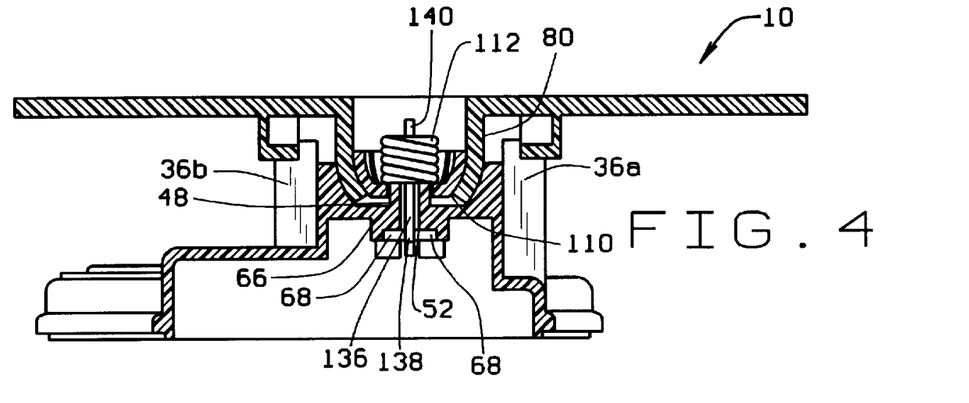
FIG. 4 is a cross-sectional view of the assembly of the invention without the mirror, showing the connection sub-assembly of FIG. 2 during installation of the lock key prior to the lock key being rotated to be received in grooves in the support structure.
Figure 5:
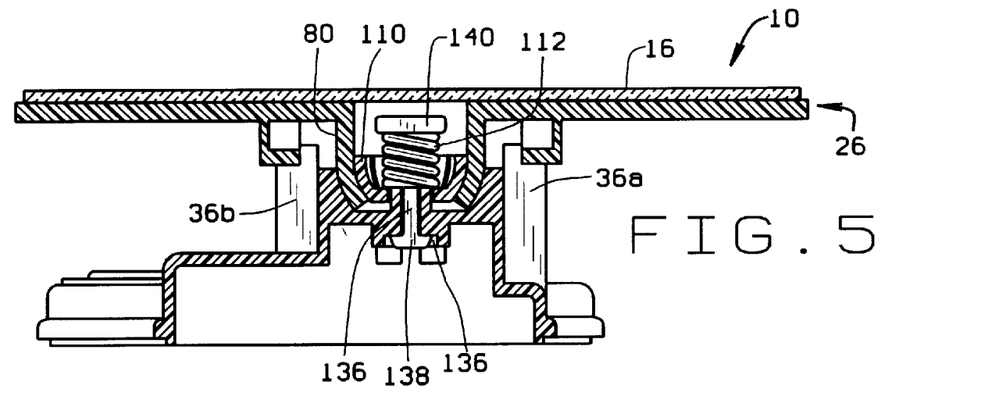
FIG. 5 is a cross-sectional view of the assembly of the invention similar to that of FIG. 4, but with the lock key rotated 90° relative to its position in FIG. 4 and with the proximal end of the lock key received in the grooves of the support structure so that the mirror assembly is secured together.

The mirror assembly 10, of which the mirror 16 is only a part, is shown in more detail in FIGS. 3–5. Generally, the rear view mirror assembly 10 of the present invention comprises a base or support structure 18 illustrated as a cover for a motor assembly 24, a mirror mount 26 to which the mirror 16 is fixed; and a connection subassembly 28 which secures the mirror mount 26 to the support structure 18.

Figure 9:
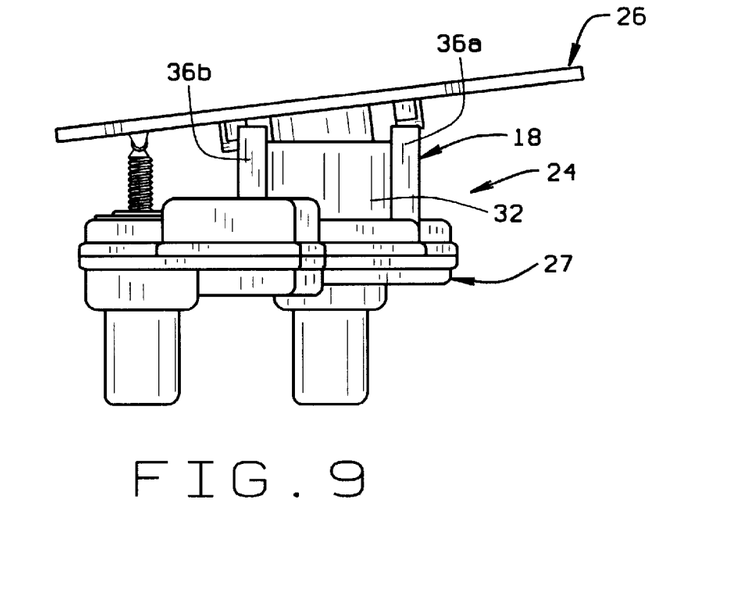
FIG. 9 is an end view of the support structure with the mirror mount and mirror pivotally mounted thereto.
Figure 10:
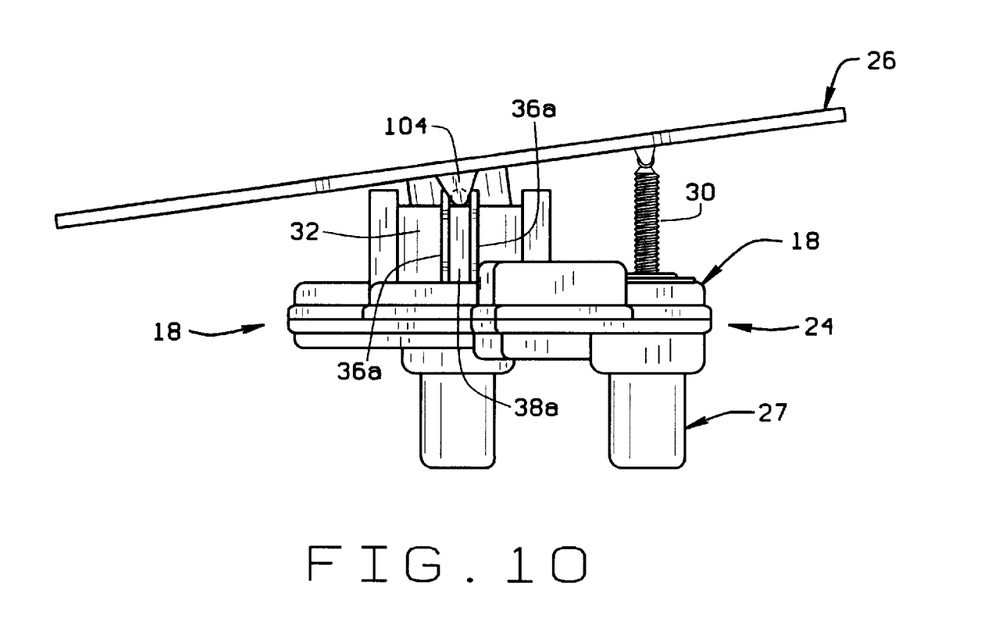
FIG. 10 is a side view of the support structure illustrated as a motor housing, showing the mirror mount pivotally mounted thereto.

The support structure or motor assembly cover 18 is mated to a motor assembly base 27. (FIGS. 9 and 10) The cover 18 and base 27 of the motor assembly 24 can house a pair of motors, as is known, which are electrically operated by a switch accessible to the driver. The motors drive gears, which in turn, drive a pair of screws 30 which are operatively connected to the mirror mount 26 to push the mirror mount away from, or pull the mirror mount toward, the support structure 18, depending on the direction the motor is driven. The screws 30 are connected to the mirror mount 26 in any manner known in the art. The manner of operation of the motors, gears, and screws 30 of the motor assembly 24 is conventional and does not form a part of the invention. Various forms of motor assemblies can be used, as is known in the art, such as those employing spur gears, for example.

The support structure 18 has a cylindrical wall 32 extending upwardly from its top surface 34. Two pair of spaced apart arms 36a and 36b extend outwardly from the wall 32. The arms 36a and 36b each define a space 38a and 38b therebetween and each extend above the top edge 39 of the wall 32.

Figure 6:
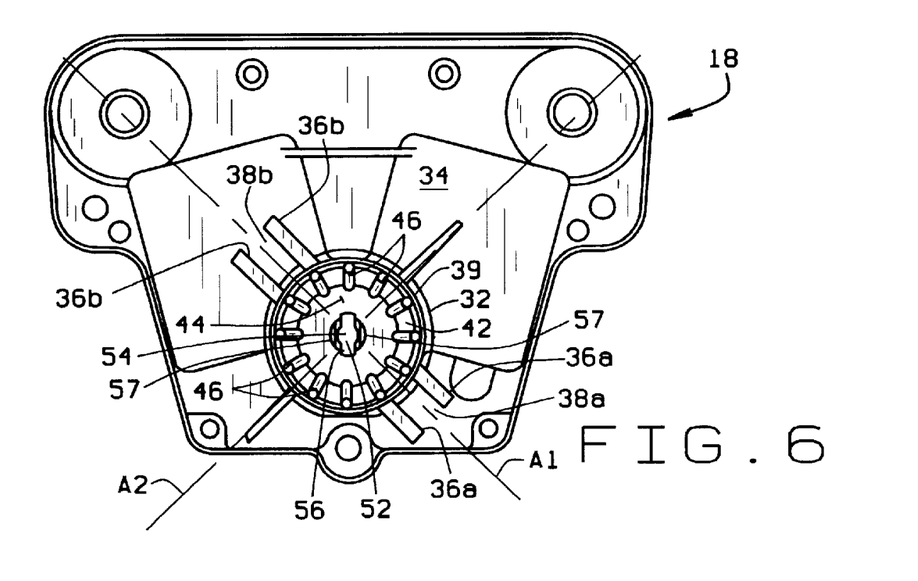
FIG. 6 is a top plan view of the support structure illustrated as a cover for the motor assembly, showing the area that receives the mirror mount and the connection subassembly.
Figure 7:
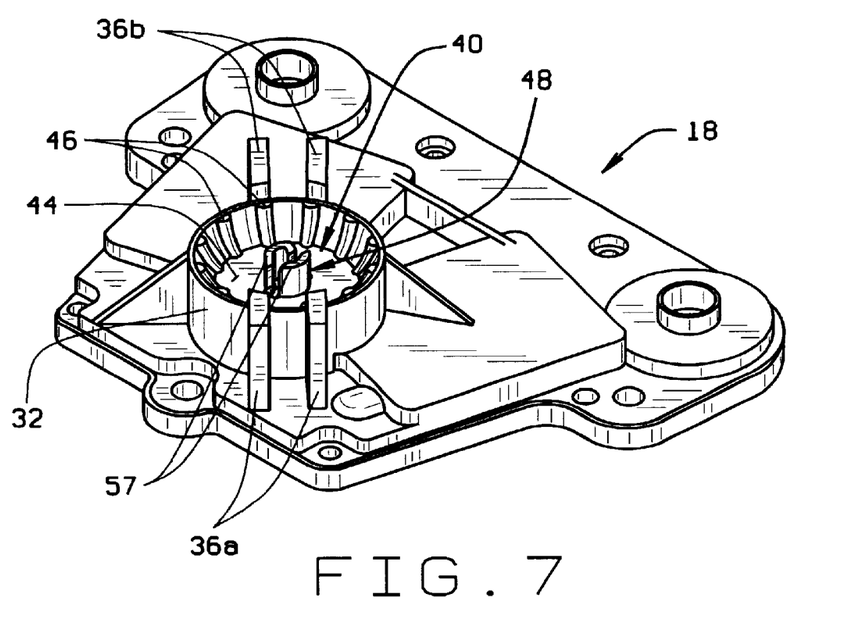
FIG. 7 is a perspective view of the support structure.
Figure 8:
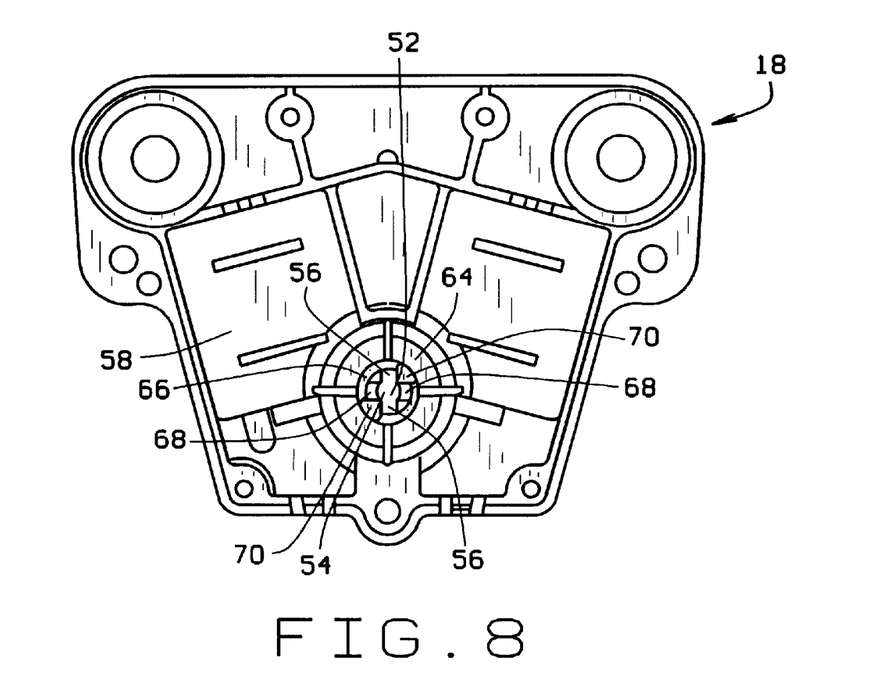
FIG. 8 is a bottom plan view of the support structure illustrated as a motor housing, showing the opening through which the proximal end of the lock key is received.

A socket, well, or recess 40 is formed within the cylindrical wall 32. The socket 40 has a generally curved side surface 42 and a generally flat bottom surface 44. A plurality of ribs 46 extend the length of the side surface 42, from the top thereof to the bottom thereof. A circular boss 48 extends up through the socket 40 from the socket bottom 44. The boss 48 is generally centered with respect to the bottom 44 and has a top edge 50 which is spaced below the top edge 39 of the wall 32. An elongate slot 52 extends through the boss 48. As seen in FIGS. 6–8, the slot 52 has a generally cylindrical center portion 54 with two arms 56 radiating from opposite sides of the center portion. As seen in FIG. 6, the slot arms 56 generally bisect the boss 48, and thus the boss 48 is formed by two arcuate spaced-apart projections 57. The outer surfaces of the projections 57 are preferably slightly tapered so that the boss 48 has an outer diameter at its top which is slightly smaller than the outer diameter at its bottom.

The support structure has a bottom surface 58 which can be seen in FIGS. 3 and 8. A recess 60 is defined by the inner surface 62 of the wall 32 and extends upwardly from the bottom surface 58. The recess 62 has a top 64 and a boss 66 extending downwardly from the center of the top 64. The slot 52 extends through the boss 64. A pair of oppositely extending grooves 68 are formed in the lower surface of the boss 66. The grooves 68 extend perpendicularly to the arms 56 of the slot 52. The slot arms 56 and the grooves 68 cooperate to form a cross or plus ("+") design on the bottom of the boss 66, as seen in FIG. 8. A pair of wedge shaped buttresses 70 extend from the bottom surface of the boss 66. The buttresses 70 are positioned 180° apart (i.e. are opposite each other) and are sized such that the side edges of the buttresses are generally flush with the edges of the slot arms 56 and the grooves 68.

The mirror mount 26 (FIG. 3) has a mirror back 74 having an upper surface 76 to which the mirror 16 is secured in any conventional manner and a lower surface 78. A hollow sleeve 80 extends from the mirror back lower surface 78. The mirror back 74 has an opening 82 which opens into the sleeve 80. The sleeve 80 has a side wall 90 which has a generally cylindrical upper part 92 and a lower portion 94 which curves inwardly. The curvature of the sleeve's side wall lower portion 94 generally corresponds to the curvature of the side wall 42 of the support structure well 40, and is sized and shaped to be received in the well 40. The bottom of the sleeve 80 has an opening 96. The diameter of the opening 96 is preferably greater than the outer diameter of the boss 48 which extends up from the well floor 44. The mirror mount is preferably made of an ABS polycarbonate alloy such as is sold by General Electric under the trademark CYCOLOY®, or other suitable materials.

The mirror mount also has a pair of plates 100 (FIG. 3) spaced from the sleeve 80 and positioned on opposite sides of the sleeve 80. The plates 100 have a generally cylindrical bar 102 extending across their bottom edges and a triangular buttress 104 (FIG. 10) extending perpendicularly along the outer edge of the plates 100. The plates 100 are sized and positioned such that the bars 102 are received in the spaces 38a and 38b between the arms 36a and 36b which extend from the support structure wall 32. The bars 102 have a diameter slightly less than the width of the spaces 38a and 38b.

When the mirror mount 26 is placed on the support structure 18, the mirror mount sleeve 80 is received in the support structure well 40 and the mirror mount plates 100 are received in the spaces 38a and 38b, as just noted. The interfitting or nesting of the curved end of the sleeve 80 in the generally arcuate well 40 creates a type of "ball and socket joint" which enables the mirror mount 26 to pivot relative to the support structure 18. The interaction of the plates 100 with the arms 36a,b and the spaces 38a,b defined thereby prevent the mirror mount from rotating relative to the support structure 18 in a horizontal plane, with reference to the FIGS. Thus, the mirror mount cannot be spun in a plane that is generally parallel to the support structure 18. Rather, the mirror mount pivots about two perpendicular axis, the first of which is defined by a line A1 (FIG. 6) which extends through the middle of the spaces 36a,b. The line or axis A1 is defined by the pivot bars 102 of the mirror mount 26. The second axis is defined by a line A2 which is perpendicular to the axis A1 and which extends through the center of the central portion 54 of the slot 52.

Figure 2:
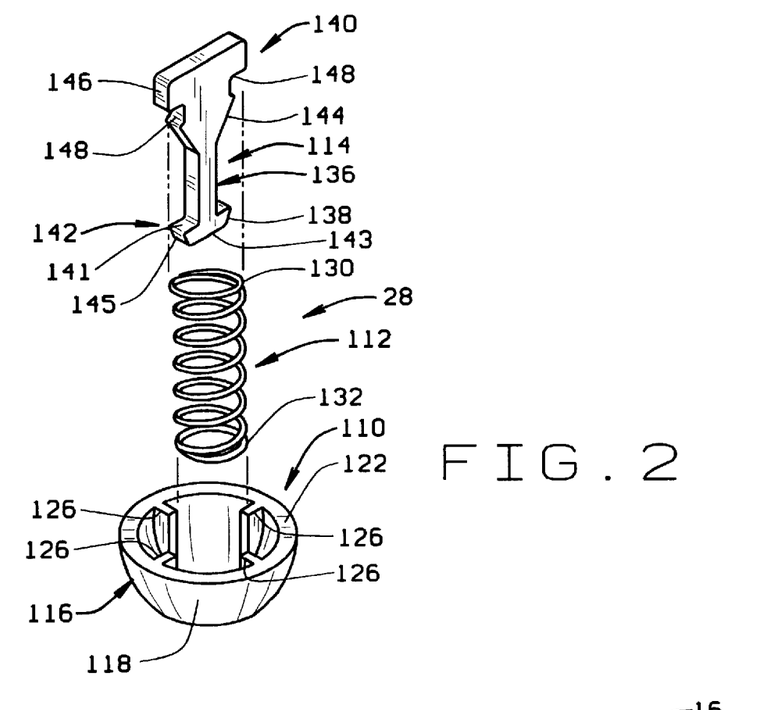
FIG. 2 is an exploded view of a connection subassembly of the invention showing a pivot member illustrated as a cup, a biasing means illustrated as a helical spring, and a lock key.

The connection subassembly 28, shown in FIG. 2, includes a pivot cup 110, a helical spring 112, and a metal lock key 114. The cup 110 is sized and shaped to be received in the mirror mount sleeve 80. The cup 110 thus has a side wall 116 having a generally arcuate exterior surface 118. The curvature of the cup's exterior surface 118 corresponds to the curvature of the inner surface of the mirror mount sleeve 80 so that the cup 110 will be snugly and firmly received in the sleeve 80, as seen in FIGS. 4 and 5. The preferred embodiment illustrates the cup 110 as having an outer surface 118 which is shaped generally as a truncated hemisphere, that is, the walls are arcuate in cross-section, the arcs of the walls defining a segment of a circle.

The cup 110 is open at its top or distal end 122 and has an opening 124 in its bottom or proximal end. The opening 124 is sized to be snugly received about the support structure boss 48 in the support structure well 40. Preferably, the diameter of the cup opening 124 is slightly less than the outer diameter of the support structure boss 48. For example, The diameter of the cup opening 124 can be about 5.3 mm and the outer diameter of the projections 57 at their bases can be about 5.5 mm. Thus, the radius of the boss projections 57 is about 2 mm or about 0.005"–0.015" greater than the diameter of the cup opening 124. Thus, when the cup 110 is applied to the support structure 18, as will be described below, the projections 57 which form the boss 48 will be deflected slightly inwardly.

The cup includes a plurality of ribs 126 which extend inwardly from the inner surface of the cup wall 116. The ribs 126 are preferably evenly spaced about the interior of the cup. Preferably, four ribs are provided. The cup is preferably made from an acetal copolymer, such as is sold by Hoechst Celenese Corp. under the trademark CELCON®, grade M90, or other suitable materials.

The helical spring 112 is received in the cup 110 and is sized to fit over the mirror mount boss 48. The spring 112 has a top or distal end 130 and a bottom or proximal end 132.

The lock key 114 has a stem 136, a bottom member 138 at the bottom or proximal part of the stem, and an upper body 140 at the top or distal part of the stem. The bottom member 138 crosses the stem 136 to give the proximal end of the lock key a "T"-shaped end 142. The T-end 142 of the lock key 114 has an top edge 141 and a bottom edge 143. The T-end bottom edge 143 is slightly shorter than the T-end top edge 141, and the top and bottom edges are connected by sloping or tapered side edges 145, such that the T-end 142 is generally trapezoidal in shape. T-end top edge 141 has a length that is shorter than the length of the slot 52 of the support structure 18 and slightly longer than the diameter of the cup opening 124. The edge 141 preferably has an overall length of about 5.5 mm. The T-end bottom edge 143 has a length that is equal to, or slightly shorter than, the diameter of the cup opening 124. The cup 110 is made from a pliable material so that as the lock key T-end 142 is passed through the cup hole 124, the tapered shape of the T-end 142 will cause the cup hole 124 to expand to allow the T-end 142 through the cup hole 124. When the T-end 142 passes through the cup hole 124, the T-end top edge 141 will bear against the bottom surface of the cup 110, creating a slight interference fit between the T-end and the cup bottom. Stated differently, the T-end overlies the bottom of the cup by about 0.005"–0.015" (about 0.13 mm–0.32 mm) to create the noted interference fit to prevent the lock key 114 from being removed from the cup 110 once the two components are assembled. Thus, the lock key 114 and the cup 110 can be assembled with the spring 112 to form a sub-assembly which is then used, as explained below, to connect the mirror mount 26 to the support structure 18.

The lock key upper body 140 has an inverted triangular portion 144 and a top or distal member 146, both of which are co-planar with the bottom member 138. The top member 146 and the top of the triangular portion 144 are spaced apart by inwardly extending grooves or cut-outs 148. The inner surfaces of the grooves 148 are spaced apart by a distance slightly less than the diameter of the helical spring 112. The ends of the top member 146, however, extend beyond the top of the triangular portion 144, and the top member 146 has a length greater than the diameter of the helical spring 112.

To assemble the mirror assembly 10, the mirror mount 26 is inserted in the support structure 18 as noted above. The locking key 114 is passed through the spring 112 so that the proximal end 132 of the spring 112 abuts the lower surface of the lock key top member 146. The spring 112 will then be received in the grooves 148 of the lock key. The spring 112 and lock key 114 are then placed in the pivot cup 110 so that the proximal ends of the lock key and spring are adjacent the bottom of the cup, as seen in FIG. 3. As described above, the lock key T-end 142 is slightly larger than the diameter of the cup opening 124 and deflects the cup opening 124 as the T-end 142 is passed through the cup opening 124. Once the T-end 142 passes through the cup opening 124, the opening 124 substantially returns to its original shape, and the T-end creates an interference fit with the cup opening 124, so that the lock key 114 cannot fall out of, or be easily removed from the cup 110. The cup 110, lock key 114 and spring 112 thus form the connection sub-assembly 28. Preferably, the connection sub-assembly 28 is pre-formed or pre-assembled and then used to secure the mirror mount 26 to the support structure 18.

The connection sub-assembly 28 is then inserted in the sleeve 80 of the mirror mount 26. The T-end 142 of the locking key 114 is aligned with the slot 52 in the well boss 48 of the support structure. The locking key T-end 142 is passed through the slot 52 and the cup opening 124 is journaled about the projections 57. (FIG. 4) As the spring 112 is sandwiched between the top member 146 of the lock key and the bottom of the cup 110, the act of passing the lock key 114 through the slot 52 compresses the spring 112. Once the T-end 142 of the lock key 114 clears the bottom surface of the boss 66, as shown in FIG. 4, the lock key 114 is rotated 90° so that the T-end 142 of the lock key will pass from the slot arms 56 into alignment with the grooves 68. (FIG. 5) In practice, the lock key is rotated counter-clockwise (with reference to FIG. 8) until the T-end 140 comes into contact with the buttresses 70 on the bottom 58 of the support structure 18. The sides of the buttresses 70 act as stops to prevent the lock key 114 from being rotated too far. If the lock key 114 is rotated in the improper (i.e., clockwise) direction, with reference to FIG. 8) the T-end 142 will engage the side walls of the buttresses 70 and the buttresses will resist or prevent clockwise rotation of the lock key 114. When the T-end 142 of the locking key 114 is aligned with the grooves 68 in the support structure, the lock key 114 is released. As can be appreciated, the spring 112 will exert a force against the lock key top member 146 to push the lock key 114 upwardly in the direction of the lock key's distal end. The spring 112 also will exert a force against the proximal end of the cup 110. Because the T-end 142 of the lock key 114 is engaged in the grooves 68 of the boss 66, the spring 112 will not be able to push the lock key 114 from the cup 110. Thus, the interaction of the lock key with the spring and the support structure secure the mirror mount to the support structure.

When the cup 110 is installed with the sleeve 80, the snug fit of the boss projections 57 within the cup opening 124 help to resist wobbling of the mirror mount 26 and mirror 16 relative to the support structure 18.

The structure of the mirror assembly 10 of the present invention provides for a zero clearance fit of the cup 110 to the mirror mount sleeve 80. This zero clearance fit, and the retaining action generated by the spring 112 and lock key 114 provide for a stable attachment of the mirror mount 26 to the support structure 18 which will prevent the mirror from wobbling in the housing 12. The user will thus not be presented with a jumpy or blurred image.

When the mirror assembly is completed, the ribs press against the sleeve 80 to provide for a snug engagement of the sleeve 80 in the well 40. The ribs 46 provide for a more uniform seat for the sleeve 80. It is generally difficult to mold two interfitting spherical parts which are designed to seat against each other with a uniform contact about the spherical surfaces of the two pieces. The use of the ribs 46 in the well 40 provide for a more uniform contact between the sleeve 80 and the well 40.

The use of the lock key 114 and spring 112 will prevent over tightening of the mirror mount 26 to the support structure 18. Such over-tightening may easily occur if a screw were used to connect the members of the mirror assembly together. Over-tightening could lead to stripping of threads, in which case, the mirror assembly would not be held together securely. Over-tightening can also lead to cracking of the components of the mirror assembly, again, in which case the mirror assembly would not be held securely together. As can be appreciated, the use of the lock key 114 and the spring 112 alleviates these problems. In currently available mirror assemblies, the spring of the assembly exerts its force against plastic parts. This will tend to stretch the plastic parts over time which will reduce image stability of the mirror and, give jumpy and blurred images. The lock key 114 of the mirror assembly 10, however is metal, and absorbs the forces of the spring 112. In fact, the cup 110, the mirror mount 26, and the support structure 18 are all preferably made of plastic. Thus, the lock key 114 is virtually the only metal component of the mounting structure of the mirror assembly 10. Because the metal lock key 114 will not stretch as easily as a plastic part, and because very little, if any, of the plastic of the mirror assembly 10 is under compression forces, the connection of the mirror mount to the support structure will remain stable for longer periods of time.

In the foregoing, when reference is made to upper, top, lower, or bottom in describing the various parts of the mirror assembly 10, such directional description is made with reference to the drawings.

In view of the above, it will be seen that the several objects and advantages of the present invention have been achieved and other advantageous results have been obtained. As various changes could be made in the above constructions without departing from the scope of the invention, it is intended that all matter contained in the above description or shown in the accompanying drawings shall be interpreted as illustrative and not in a limiting sense. For example, although the spring 112 is preferably a helical spring, it could be replaced with a curved leaf spring or a resilient plastic or rubber member which will perform the same function as the spring 112. Further, one or both of the bosses 48 and 66 could be eliminated. All that is necessary is that the T-end 138 of the lock key 114 pass through the support structure well 40 so that the T-end of the lock key engages the bottom surface of the support structure. The proximal end 138 of the lock key 114 could be "L"-shaped or another desired shape, rather than T-shaped described. These examples are merely illustrative.

I claim:

1. In an automotive exterior rear view mirror assembly, comprising a mirror mount, a mirror associated with said mirror mount, and a support structure to which the mirror mount is pivotally mounted, improvements comprising:

(a) the support structure comprising a well defined by a side surface and a bottom surface, a first boss extending upwardly from the bottom surface of said well, said first boss comprising a pair of spaced apart projections separated by a slot, said first boss projections being flexible towards each other, with an opening extending through said well bottom surface and through said first boss;

(b) wherein the mirror mount comprises a mirror back having a top surface and a bottom surface, a hollow sleeve extending from said mirror back bottom surface, said sleeve being sized and shaped to be nested in said support structure well, said sleeve having an opening therethrough, said well opening being accessible through said sleeve opening;

(c) a pivot member for providing pivotal movement of the mirror mount relative to said support structure, said pivot member having an opening therethrough, the pivot member having a proximal end and a distal end, the pivot member having an inner surface and an outer surface, the outer surface having a generally convex shape that curves inwardly to extend transversely into the proximal end of the pivot member, with an opening extending through said pivot member and through the proximal end of the pivot member, and said first boss extending through said pivot member opening and through the proximal end of the pivot member with the first boss engaging the pivot member about its proximal end, said first boss projections deflecting inwardly when the pivot member is mounted to said first boss;

(d) a lock key for holding the pivot member to said support structure; said lock key having a proximal end and a distal end; said pivot member opening being sized to allow the proximal end of the lock key to extend therethrough so that the proximal end of the lock key can interact with the support structure to hold the pivot member and mirror mount to the support structure to allow the mirror mount to pivot relative to the support structure; the lock key having at its proximal end a transverse part for engaging the support structure; the lock key proximal end extending through the opening of the pivot member; and (e) means for biasing the lock key in a direction away from the support structure to force the lock key to engage the support structure; the biasing means applying a force to the pivot member so that the pivot member is held to the support structure to allow the mirror mount to pivot relative to the support structure and relative to the pivot member; and wherein the biasing means has a proximal end and a distal end and the proximal end of the biasing means is positioned to urge the pivot member in a direction away from the distal end of the lock key.

2. In the automotive exterior rear view mirror of claim 1 wherein the first boss projections each have a top and a bottom, and the first boss projections have outer surfaces that are slightly tapered so that the first boss has an outer diameter at its top which is slightly smaller than the outer diameter at its bottom.

3. In the automotive exterior rear view mirror assembly of claim 2 wherein the top ends of the first boss projections have an arcuate shape.

4. The exterior side view mirror of claim 3 wherein, when said lock key T-end is passed through said cup opening, said sloped edges of said T-end engage the walls of the opening causing said walls to expand.

5. In the automotive exterior rear view mirror assembly of claim 2 wherein the opening through the pivot member has a diameter which is slightly smaller than the outer diameter of said first boss.

6. In the automotive exterior rear view mirror assembly of claim 5 wherein said proximal end of said lock key is generally "T" shaped, and said T-end of said lock key has an edge having a length greater than the diameter of said cup opening, and said T-end is configured so that when said lock key T-end is inserted through said cup opening, said cup opening deflects to allow said lock key T-end therethrough, said cup opening returning substantially to its original shape when said lock key T-end passes therethrough.

7. The exterior side view mirror of claim 2 wherein said lock key T-end has an upper surface and a lower surface, said T-end upper surface being shorter than said T-end lower surface; said T-end upper and lower surfaces being connected by sloping edges.

8. In the automotive exterior rear view mirror assembly of claim 1 wherein the opening extending through said first boss comprises a slot which divides the first boss into the two projections.

9. In the automotive exterior rear view mirror assembly of claim 8 further comprising the support structure comprising a lower surface, with a second boss extending from said lower surface in a direction opposite to the said first boss, said second boss having a slot in alignment with the slot extending through the first boss, said second boss comprising a groove so that said proximal end of said lock key can be received in said groove upon rotation of said lock key relative to said support structure.

10. In the automotive exterior rear view mirror assembly of claim 9 wherein said opening through said second boss is generally elongate, and wherein said proximal end of said lock key is generally "T" shaped, and said groove and slot in said second boss opening form a "+".

11. In the automotive exterior rear view mirror assembly of claim 10 wherein the second boss has a bottom surface, and the second boss comprises a pair of buttresses that extend from the bottom surface of the second boss, said buttresses being positioned opposite one another, with the buttresses being positioned so that when the lock key is rotated relative to the second boss the T-end of the lock key contacts the buttresses so that the buttresses act as stops to prevent the lock key from being rotated too far.

12. In the automotive exterior rear view mirror assembly of claim 1, wherein the biasing means is a spring, and wherein the lock key engages the spring so that the spring applies a biasing force against the lock key in a direction toward a distal end of the lock key, and wherein said spring applies a biasing force against the pivot member in a direction away from the distal end of the lock key.

13. In the automotive exterior rear view mirror assembly of claim 12, wherein the lock key comprises a bottom member and a top member located distally of said bottom member, with the spring having a distal end and a proximal end, and wherein the distal end of the spring is urged against the top member of the lock key.

14. In the automotive exterior rear view mirror assembly of claim 13, wherein the lock key extends through the spring.

15. In the automotive exterior rear view mirror assembly of claim 14, wherein the distal member of the lock key comprises two arm members, and wherein the spring distal end urges against both said arm members.

16. The exterior side view mirror of claim 1 wherein said lock key T-end forms an interference fit with said cup.

17. The exterior side view mirror of claim 1 wherein said cup, said lock key, and said resilient member define a connection sub-assembly, said connection sub-assembly being used to connect said mirror mount to said support structure.

18. An exterior side view mirror assembly of an automobile comprising:
 (a) a support structure comprising a well defined by a side surface and a bottom surface, a first boss extending upwardly from the bottom surface of said well, said first boss having an outer diameter and comprising a pair of spaced apart projections, and an opening extending through said well bottom surface and through said first boss;
 (b) a mirror mount comprising a mirror back having a top surface and a bottom surface, a hollow sleeve extending from said mirror back bottom surface, said sleeve being sized and shaped to be nested in said support structure well, said sleeve having an opening in the bottom thereof, said well opening being accessible through said sleeve opening;
 (c) a cup positionable within the mirror mount sleeve, said cup having a proximal end and a distal end, said cup having an opening in its proximal end, said cup having an outer surface having a generally convex shape which outer surface curves inwardly to extend transversely into the proximal end of the cup, with the proximal cup end extending inwardly from the curved outer surface of the cup;
 (d) a lock key for holding the cup, and hence the mirror mount, to the support structure to allow the mirror mount to pivot relative to the support structure; said lock key having a proximal end and a distal end; said lock key extending through the opening in the cup so that the proximal end of the lock key engages a lower surface of the support structure to hold the cup and the mirror mount to the support to allow the mirror mount to pivot relative to the support structure and relative to the cup; said proximal end of said lock key being shaped to engage said lower surface of said support structure; and
 (e) a resilient member which biases the lock key away from the support structure so that the proximal end of the lock key is forced to engage the said support structure;
 (f) said proximal cup opening having a diameter which is slightly smaller than the outer diameter of said first boss, said projections being flexible so that when said cup is applied to said first boss, said projections deflect inwardly and the first boss extends through the proximal cup opening, with the first boss projections engaging the cup about the proximal cup opening.

19. The exterior side view mirror of claim 18 wherein said support structure includes a groove on said support structure bottom surface which intersects said support structure opening, said proximal end of said lock key being received in said groove upon rotation of said lock key relative to said support structure.

20. The exterior side view mirror of claim 19 wherein the opening extending through the first boss comprises a slot which divides the first boss into the pair of projections, and wherein said support structure opening is generally elongate; wherein said proximal end of said lock key is generally "T" shaped and said slot and said groove in said support structure opening forming a "+".

21. The exterior side view mirror of claim 19 wherein said proximal end of said lock key is generally "T" shaped, and said T-end of said lock key has an edge having a length greater than the diameter of said cup opening, so that when said lock key T-end is inserted through said cup opening, said cup opening deflects to allow said lock key T-end therethrough, said cup opening returning substantially to its original shape when said lock key T-end passes therethrough.

22. The exterior side view mirror of claim 21 wherein said lock key T-end forms an interference fit with said cup.

23. The exterior side view mirror of claim 22 wherein said cup, said lock key, and said resilient member define a connection sub-assembly, said connection sub-assembly being used to connect said mirror mount to said support structure.

24. The exterior side view mirror of claim 22 wherein said lock key T-end has an upper surface and a lower surface, said T-end upper surface being shorter than said T-end lower surface; said T-end upper and lower surfaces being connected by sloping edges.

25. The exterior side view mirror of claim 24 wherein, when said lock key T-end is passed through said cup opening, said sloped edges of said T-end engage the walls of the opening causing said walls to expand.

26. The exterior side view mirror of claim 18 wherein said support structure includes two sets of arms extending from opposite sides of said well, said arms defining oppositely extending channels; and said mirror mount including corresponding plates extending from said mirror back bottom surface which are received in said support structure channels.

27. The exterior side view mirror assembly of claim 26 wherein said plates have generally cylindrical bars extending across their bottom edges, said bars having a diameter sized to be received in said channels, said bars defining a pivot axis of said mirror mount.

28. The exterior side view mirror of claim 18 wherein the first boss projections each have a top and a bottom, and the first boss projections have outer surfaces that are slightly tapered so that the first boss has an outer diameter at its top which is slightly smaller than the outer diameter at its bottom.

29. The exterior side view mirror assembly of claim 28 wherein the opening extending through said first boss comprises a slot which divides the first boss into the two projections.

30. The exterior side view mirror assembly of claim 29 wherein the top ends of the first boss projections have an arcuate shape.

31. The exterior side view mirror of claim 18 wherein the opening extending through the first boss comprises a slot which divides the first boss into the two projections, further comprising the support structure comprising a lower surface, with a second boss extending from said lower surface in a direction opposite to the said first boss, said second boss having a slot in alignment with the slot extending through the first boss, said second boss comprising a groove so that said proximal end of said lock key can be received in said groove upon rotation of said lock key relative to said support structure.

32. The exterior side view mirror of claim 31 wherein said opening through said second boss is generally elongate, and wherein said proximal end of said lock key is generally "T" shaped, and said groove and slot in said second boss opening form a "+".

33. The exterior side view mirror of claim 32 wherein the second boss has a bottom surface, and the second boss comprises a pair of buttresses that extend from the bottom surface of the second boss said buttresses being positioned opposite one another, with the buttresses being positioned so that when the lock key is rotated relative to the second boss the T-end of the lock key contacts the buttresses so that the buttresses act as stops to prevent the lock key from being rotated too far.

34. An exterior side view mirror assembly of an automobile comprising:
   (a) a support structure comprising a well defined by a side surface and a bottom surface, a boss extending upwardly from the bottom surface of said well, said boss comprising a pair of spaced apart projections; and an opening extending through said well bottom surface and through said boss;
   (b) a mirror mount comprising a mirror back having a top surface and a bottom surface, a hollow sleeve extending from said mirror back bottom surface, said sleeve being sized and shaped to be nested in said support structure well, said sleeve having an opening in the bottom thereof, said well opening being accessible through said sleeve opening;
   (c) a cup positionable within the mirror mount sleeve, said cup having a proximal end and a distal end, said cup having an opening in its proximal end; said cup opening having a diameter which is slightly smaller than the outer diameter of said boss, said projections being flexible, so that when said cup is applied to said boss, said projections deflect inwardly;
   (d) a lock key for holding the cup, and hence the mirror mount, to the support structure to allow the mirror mount to pivot relative to the support structure; said lock key having a proximal end and a distal end; said lock key extending through the opening in the cup so that the proximal end of the lock key engages a lower surface of the support structure to hold the cup and the mirror mount to the support to allow the mirror mount to pivot relative to the support structure and relative to the cup; said proximal end of said lock key being shaped to engage said lower surface of said support structure; said proximal end of said lock key being generally "T" shaped, and said T-end of said lock key having an edge having a length greater than the diameter of said cup opening, so that when said lock key T-end is inserted through said cup opening, said cup opening deflects to allow said lock key T-end therethrough, said cup opening returning substantially to its original shape when said lock key T-end passes therethrough; and
   (e) a resilient member which biases the lock key away from the support structure so that the proximal end of the lock key is forced to engage the said support structure.

35. In an automotive exterior rear view mirror assembly, comprising a mirror mount, a mirror associated with said mirror mount, and a support structure to which the mirror mount is pivotally mounted, improvements comprising:
   (a) the support structure comprising a well defined by a side surface and a bottom surface, a first boss extending upwardly from the bottom surface of said well, said first boss comprising a pair of spaced apart projections, the first boss projections each having a top and a bottom and having outer surfaces that are slightly tapered so that the first boss has an outer diameter at its top which is slightly smaller than the outer diameter at its bottom, with an opening extending through said well bottom surface and through said first boss, said opening comprising a slot which divides the first boss into the two projections;
   (b) wherein the mirror mount comprises a mirror back having a top surface and a bottom surface, a hollow sleeve extending from said mirror back bottom surface, said sleeve being sized and shaped to be nested in said support structure well, said sleeve having an opening therethrough, said well opening being accessible through said sleeve opening;
   (c) a pivot member for providing pivotal movement of the mirror mount relative to said support structure, said pivot member having an opening therethrough, the pivot member having a proximal end and a distal end, the pivot member having an inner surface and an outer surface, the outer surface having a generally convex shape that curves inwardly to extend transversely into the proximal end of the pivot member, with an opening extending through said pivot member and through the proximal end of the pivot member, and said first boss extending through said pivot member opening and through the proximal end of the pivot member, the opening through the pivot member having a diameter which is slightly smaller than the outer diameter of said first boss and wherein said first boss projections are flexible, so that when the pivot member is mounted to said first boss, said first boss projections deflect inwardly, with the first boss engaging the pivot member about its proximal end;
   (d) a lock key for holding the pivot member to said support structure; said lock key having a proximal end and a distal end; said pivot member opening being sized to allow the proximal end of the lock key to extend therethrough so that the proximal end of the lock key can interact with the support structure to hold the pivot member and mirror mount to the support structure to allow the mirror mount to pivot relative to the support structure; the lock key having at its proximal end a transverse part for engaging the support structure; the lock key proximal end extending through the opening of the pivot member; and
   (e) means for biasing the lock key in a direction away from the support structure to force the lock key to engage the support structure; the biasing means comprising a spring that applies a force to the pivot member so that the pivot member is held to the support structure to allow the mirror mount to pivot relative to the support structure and relative to the pivot member; the spring having a proximal end and a distal end with the proximal end of the spring positioned to urge the pivot member in a direction away from the distal end of the lock key, the lock key extending through the spring, with the spring applying a biasing force against the lock key in a direction toward a distal end of the lock key, and the lock key comprising a bottom member and a top member located distally of said bottom member, wherein the distal end of the spring is urged against the top member of the lock key.

36. The rear view mirror assembly of claim 35 further comprising the support structure comprising a lower surface, with a second boss extending from said lower surface in a direction opposite to the said first boss, said second boss having a slot in alignment with the slot extending through the first boss, said second boss comprising a groove so that said proximal end of said lock key can be received in said groove upon rotation of said lock key relative to said support structure, said opening through the said second boss being generally elongate, and wherein said proximal end of said lock key is generally "T" shaped, and said groove and slot in said second boss opening form a "+", the second boss having a bottom surface, and the second boss comprising a pair of buttresses that extend from the bottom surface of the second boss, said buttresses being positioned opposite one another, with the buttresses being positioned so that when the lock key is rotated relative to the second boss the T-end of the lock key contacts the buttresses so that the buttresses act as stops to prevent the lock key from being rotated too far.

* * * * *